Jan. 25, 1966    R. E. DIXON    3,230,988
TREE CUTTING ATTACHMENT
Filed Aug. 26, 1963    2 Sheets-Sheet 1

Raymond E. Dixon
INVENTOR.

BY Robert J. White
ATTORNEY

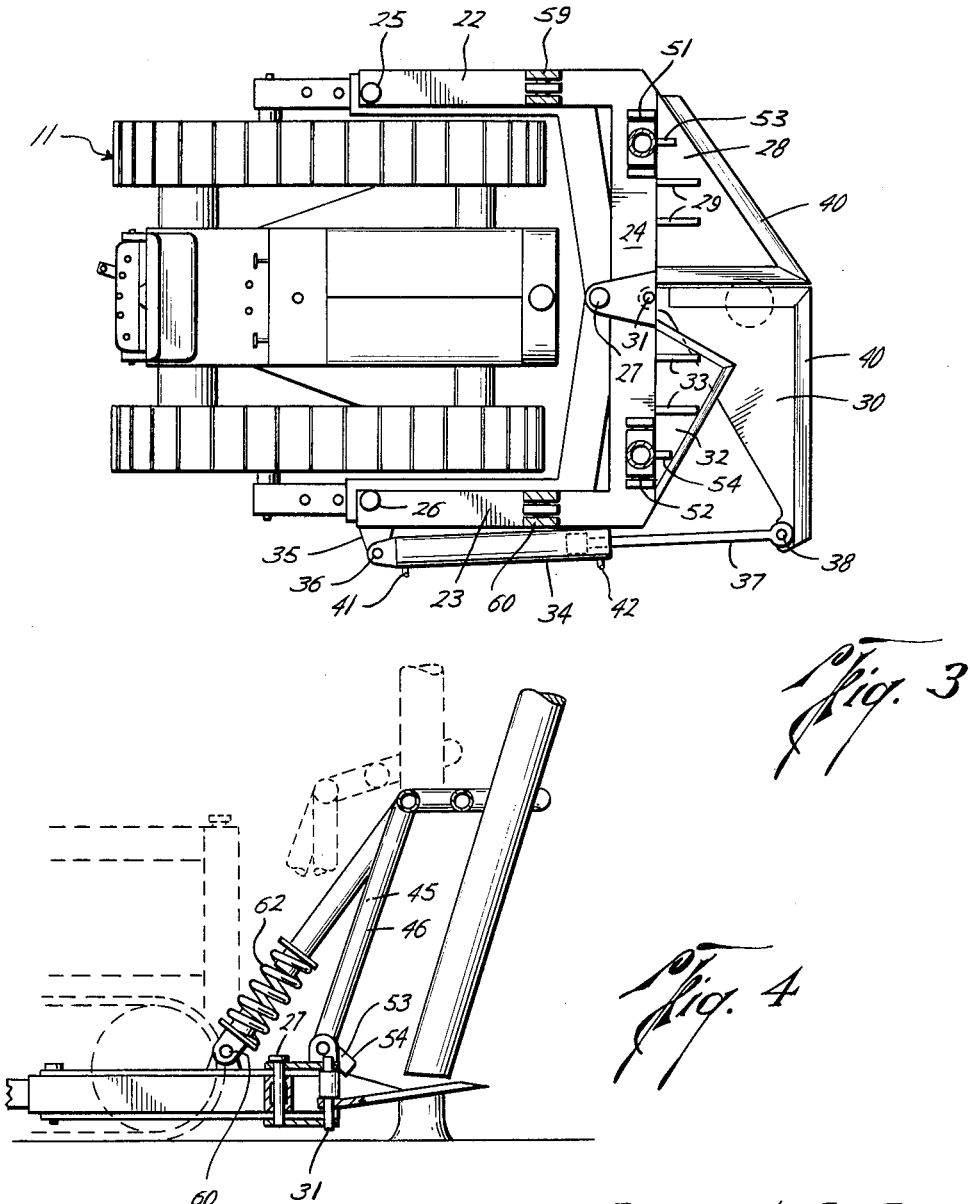

United States Patent Office 3,230,988
Patented Jan. 25, 1966

3,230,988
TREE CUTTING ATTACHMENT
Raymond Earl Dixon, Rte. 1, Broaddus, Tex.
Filed Aug. 26, 1963, Ser. No. 304,602
3 Claims. (Cl. 144—34)

My invention relates to an attachment for a work performing vehicle such as a tractor, and is specifically directed to a unit capable of cutting trees and other vegetation at or near the level of the ground by means of a power actuated blade.

In clearing wooded terrain, the removal of underbrush is not unduly difficult. Tracked or wheeled vehicles identified generally as tractors or bulldozers can readily scrape away smaller types of vegetation with their associated earth moving blades. However, a vehicle so equipped can only apply a substantially horizontal force in a manner tending either to uproot or topple an obstruction, depending on the level of application, and when the vegetation reaches sufficient size to successfully resist such force, the need arises for a device capable of cutting or severing, preferably close to the ground so as to eliminate any hazard to free vehicular movement in the area.

Efforts have been made in the past to design self-propelled vehicles having means to cut trees and other large vegetation, or cutting attachments for items of equipment of the tractor type, but none have been sufficiently meritorious to win acceptance. To the best of my information, there are at present no commercially available tree cutters adapted for mounting on conventional tractor-type vehicles to provide quick and efficient cutting of trees and brush of from small to medium size at or near ground level. The provision of such an attachment is the principal object of my invention.

It also is an object of my invention to provide a cutting attachment suitable for ready mounting and removal from conventional tractor-type vehicles, such unit having blade elements to sever trees and guide elements to control their direction of fall and eliminate the risk of damage to the vehicle or injury to its operator.

It also is an object of my invention to provide a tree cutter, the cutting elements of which constitute a fixed blade and a movable blade, the latter being rotatable about a fixed pivot into engagement with the former.

Another object of my invention is to provide a cutting attachment which employs hydraulic power to produce movement of the single cutting blade, the source of such power being the auxiliary hydraulic system which is a feature of conventional tractor-type units.

It is a further object of my invention to provide a cutter attachment having a guide frame associated therewith capable of exerting a force against the severed object so as to direct its fall away from the attachment-carrying vehicle.

It also is an object of my invention to provide a cutter of the type described which is simple in operation, economical of manufacture and sufficiently rugged to withstand the severe conditions resulting from its field of employment.

These and other objects which will become apparent are fully accomplished by the cutting attachment described hereinbelow and illustrated in the attached drawings in which:

FIG. 3 is a top view similar to FIG. 1 showing the rotating blade in its closed position, and having the guide or pusher bar assembly removed to better illustrate the operation of the cutting elements; and FIG. 4 is a side view in partial section of my cutting attachment, illustrating the operation of the pusher assembly.

Figure 1:
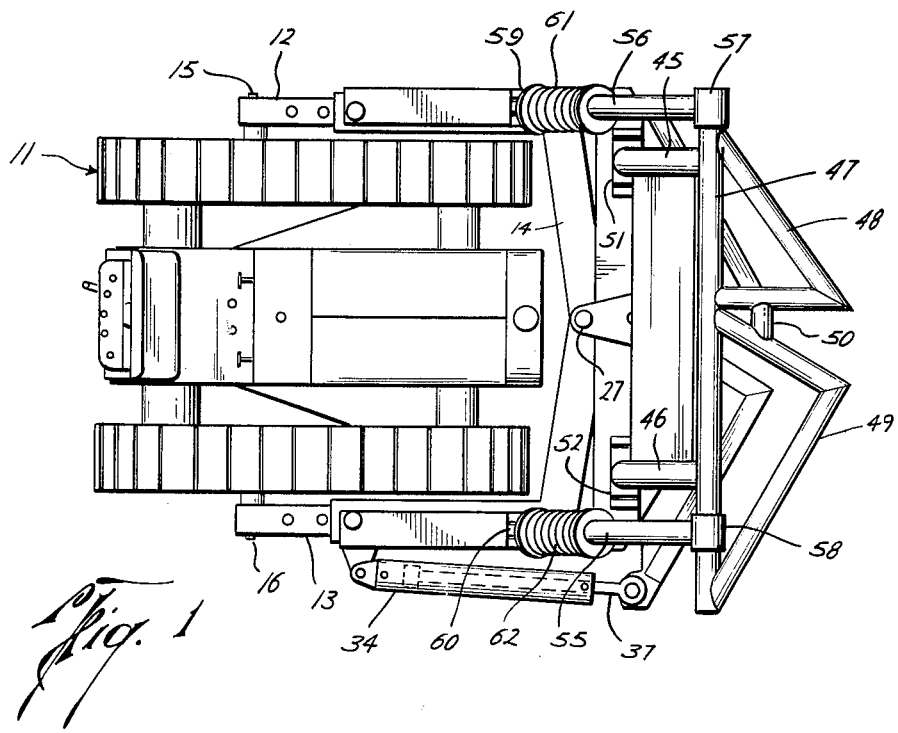
FIG. 1 is a top view of a tractor with my cutting attachment mounted thereon.
Figure 2:
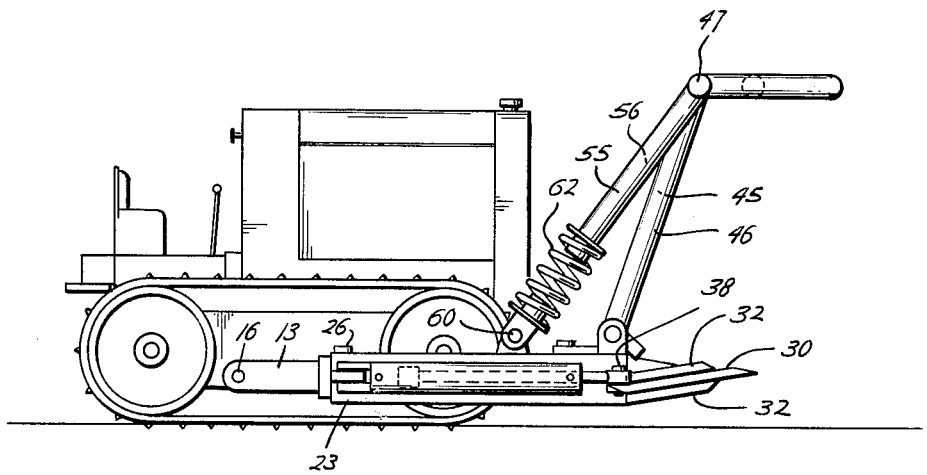
FIG. 2 is a side view of the tractor and attachment shown in FIG. 1.

Referring now to FIG. 1, reference numeral 11 indicates generally a conventional tractor-type vehicle, the details of which form no part of my present invention except as noted herein. Such vehicle is provided with a generally U-shaped blade-carrying frame having parallel side members 12 and 13, and a cross member 14 at the front of the vehicle. This frame is mounted on the body of the tractor by pivotal connections indicated generally at reference numerals 15 and 16, and some means, not shown, are provided to rotate the frame in a vertical direction about such pivots. It is sufficient for present purposes to point out that the normal function of the frame formed by members 12, 13 and 14 is to provide supporting structure for an earth-moving blade, and such frame is rotatable about the pivots 15 and 16 in order to vary the height of the blade relative to ground level. The foregoing describes the type of unit upon which my attachment is to be mounted, it being understood that the earth moving blade is first removed.

My attachment comprises two basic assemblies, the blade assembly, which includes the supporting frame, and the pusher assembly which is mounted atop such frame. The blade assembly is best shown in FIG. 3, in which the pusher assembly has been removed for clarity of illustration.

The supporting frame for my attachment is U-shaped and fits over the blade-carrying frame of the tractor. It has two side members 22 and 23 which may be of any convenient rolled steel section such as a channel or wide-flange beam. The side members are joined by the bar 24 across the front portions thereof, and the frame is secured to the blade-carrying frame by means of three pins, the two indicated by reference numerals 25 and 26 passing vertically through the side members 12 and 13 respectively, and the pin 27 passing through the cross member 14. I have found that this type of connection facilitates mounting and removal of the attachment. These pins and the hydraulic lines described subsequently herein form the only connections between my attachment and the tractor on which it is mounted.

At the front of the member 24 at one side of the center line thereof is the fixed blade 28. The gusset plates 29 provide added rigidity to this element, and the entire assembly is welded together.

The rotatable blade 30 is mounted on the other side of the front bar 24 by the centrally located pin 31 passing through both elements. Above and below the rotatable blade 30 are the guide plates 32 which are suitably supported by gusset plates 33. The guide plates maintain the rotatable blade in the plane of the blade 28 so as to insure engagement of the adjacent edges thereof when the former is rotated to its closed position as in FIG. 3.

The power for rotating blade 30 about pivot 31 into engagement with blade 28 is provided by the double acting cylinder 34 which is mounted on the side member 23 by means of bracket 35 and pin 36. The piston rod 37 of cylinder 34 is secured to the blade 30 by means of pin 38, and the range of travel of the piston rod is sufficient to rotate the blade 30 through an arc of approximately 45°.

Attention is invited to the fact that both the fixed blade 28 and the rotatable blade 30 are sharpened on all outer edges, in the areas identified generally by reference numeral 40. Thus, when the vehicle is moving through the brush which often is found in the vicinity of trees which require cutting, the blades will clear a path.

While the tractor is so moving, the blade 30 will be in its retracted position, the adjacent edges of blades 28 and 30 forming an open V. The object to be severed by rotation of the blade 30 is placed in this opening by appropriate alignment of the tractor vehicle. At the proper time, the cylinder 34 is actuated through the application of pressure fluid through the hydraulic line 41, and the rotatable blade 30 closes into engagement with fixed blade 28.

After the tree has fallen, in the direction controlled by the pusher assembly to be described hereinafter, the blade 30 is retracted by directing pressure fluid to the line 42 to cylinder 34, and relieving line 41. Although the source of pressure fluid for the lines 41 and 42 is not shown, it is to be understood that tractor-type units commonly have an auxiliary hydraulic system, and my invention contemplates employment thereof.

My experience has shown that the cutting action of a rotatable blade forced into engagement with a fixed blade is greatly superior to that of units which involve the cooperating action of two movable blades. Further, my design is less complex, has fewer moving parts, and lends itself to greater rigidity in the assembly as a whole.

The blade assembly of my attachment described hereinabove will accomplish the desired objectives quickly and efficiently, but the operation of this element alone in severing objects of substantial size or height is accompanied by a certain amount of danger to the operator of the vehicle. Thus, it may be desirable to provide some means of controlling the direction of fall of the severed tree, to which end my invention includes a pusher assembly now to be described with particular reference to FIGS. 1 and 4.

Extending vertically upward from the horizontal bar 24 are the two spaced uprights 45 and 46. The top bar 47 extends outwardly of the uprights, and is rigidly secured thereto. Mounted on the front of bar 47 are the two guide elements indicated generally by reference numerals 48 and 49, such guides being configured to follow the outer edges of the cutting blades 28 and 30 therebelow. Thus, they define a generally V-shaped slot therebetween, and may be joined by a connecting element 50. It will be apparent that the guides 48 and 49 are on each side of the upper portion of the tree which is in position for cutting, and the element 50 will bear against such tree as the vehicle is moved into proper position.

The uprights 45 and 46 are secured to the bar 24 by horizontal pivots 51 and 52, best shown in FIG. 3, and thus they are free to rotate relative to the supporting frame. However, the lugs 53 and 54 secured to such uprights near the lower ends thereof limit such rotation in the forward direction to an angle only slightly forward of vertical. Rotation in the rearward direction is limited by the two spring rods designated generally by reference numerals 55 and 56 which are rotatably secured on the top bar 47 as by sleeves 57 and 58, and mounted on the side members 22 and 23 by means of the pin connections 59 and 60.

The spring rods 55 and 56 each comprise two elements which are held in a spaced coaxial relationship by compression springs 61 and 62 respectively. Such springs are loaded in compression as a force is exerted against the guides 48 or 49, or the element 50, and the entire pusher assembly tends to rotate rearwardly about the pivots 51 and 52. It will be apparent that substantial energy will be stored in the compression springs 61 and 62 as the vehicle is moved into proper cutting position, and when the base of the tree has been severed, such energy will be released in a direction away from the cutting vehicle, thereby insuring that the tree will fall in the proper direction. Although the presently preferred embodiment of my invention employs compression springs in the pusher assembly, hydraulic cylinders or other mechanical means could be used to accomplish the same purpose, and the first alternative would permit closer control over the amount and distance of application of the force.

I presently prefer to mount the cutter blades 28 and 30 on my attachment in such manner as to place them in a substantially horizontal position when they are in close proximity to the ground. As a result, the blades are angled upwardly when the blade-carrying frame is horizontal, but under normal circumstances, it is contemplated that trees will be cut as close to the ground as possible.

It will be apparent that the principles of my invention could be incorporated into structures differing in several respects from that illustrated and described herein. Consequently, I desire to protect by Letters Patent all embodiments of my invention which fall within the scope of the following claims.

I claim:

1. In a cutting attachment for a tractor having a source of pressure fluid, the combination comprising
    (a) a supporting frame adapted for removable mounting on the tractor,
    (b) a fixed blade secured on said supporting frame and projecting forwardly therefrom in a substantially horizontal plane,
    (c) a rotatable blade pivotally mounted on said supporting frame adjacent and adapted for rotation into engagement with said fixed blade,
    (d) pressure fluid actuated means adapted for connection to the tractor source and interconnecting said supporting frame and said rotatable blade, whereby actuation of said means closes said rotatable blade into engagement with said fixed blade to sever an object therebetween, and
    (e) a pusher assembly rotatably mounted atop said supporting frame and normally extending in front of said blades, said pusher assembly having integral force responsive means tending to restore same to said normal position following rearward rotation thereof.

2. In a cutting attachment for a tractor having a forward extending frame and a source of pressure fluid, the combination comprising
    (a) a supporting frame adapted for removable mounting on the forward extending frame,
    (b) a fixed blade secured on said supporting frame and projecting forwardly and horizontally therefrom,
    (c) a rotatable blade pivotally mounted on said supporting frame adjacent and co-planar with said fixed blade for rotation into engagement therewith,
    (d) a pressure fluid actuated cylinder and piston adapted for connection to the tractor source and interconnecting said supporting frame and said rotatable blade at a point on the latter outwardly of the point of pivotal connection thereof to said supporting frame, whereby application of pressure fluid thereto moves said rotatable blade into engagement with said fixed blade to sever an object therebetween, and
    (e) a pusher assembly comprising a substantially vertical pusher frame pivotally mounted on said supporting frame for rotation in a rearward direction through a limited arc, said pusher frame having forwardly extending guide elements mounted thereon for accommodation of an object therebetween, and resilient means interconnecting said pusher frame and said supporting frame tending to return the former to said substantialy vertical position.

3. In a cutting attachment for a tractor having a forward extending frame and a source of pressure fluid, the combination comprising
    (a) a supporting frame adapted for removable mounting on the forward extending frame,
    (b) a first triangular blade attached to said supporting frame on one side of the center line thereof and projecting forwardly and horizontally therefrom,
    (c) a second triangular blade mounted on said supporting frame adjacent and co-planar with said first blade and on the opposite side of the center line thereof, (d) a vertical pin interconnecting said second blade and said supporting frame adjacent said center line whereby said second blade is rotatable into engagement with said first blade, (e) a cylinder adapted for connection to the pressure fluid source of said tractor mounted on said supporting frame rearwardly of said second blade, (f) a pressure fluid responsive piston within said cylinder connected to said second blade outwardly of said pin whereby application of pressure fluid to said cylinder extends said piston and rotates said second blade into engagement with said first blade to sever an object therebetween, and (g) cutting edges on the forwardly projecting portions of said first and second blades.

References Cited by the Examiner

UNITED STATES PATENTS

| | | | |
|---|---|---|---|
| 2,214,334 | 9/1940 | Knight | 144—34 |
| 2,504,405 | 4/1950 | Fletcher | 144—34 |
| 2,529,934 | 11/1950 | Gracey et al. | 144—34 |
| 2,565,252 | 8/1951 | McFaull | 144—34 |
| 2,650,628 | 9/1953 | Long | 144—34 |
| 2,748,813 | 6/1956 | Ford | 144—34 |
| 3,059,677 | 10/1962 | Busch et al. | 144—309 |
| 3,081,564 | 3/1963 | Prater | 144—34 |

HAROLD D. WHITEHEAD, *Primary Examiner.*

WILLIAM W. DYER, *Examiner.*